United States Patent
Noe

(10) Patent No.: US 7,143,657 B2
(45) Date of Patent: Dec. 5, 2006

(54) PLANARITY-MEASURING ROLLER FOR STEEL STRIP

(75) Inventor: Andreas Noe, Kerken (DE)

(73) Assignee: BWG Bergwerk- und Walzwerk-Maschinenbau GmbH, Duisburg (DE)

( * ) Notice: Subject to any disclaimer, the term of this patent is extended or adjusted under 35 U.S.C. 154(b) by 0 days.

(21) Appl. No.: 11/039,395

(22) Filed: Jan. 18, 2005

(65) Prior Publication Data

US 2005/0183516 A1    Aug. 25, 2005

(30) Foreign Application Priority Data

Jan. 24, 2004    (DE) .................. 10 2004 003 676

(51) Int. Cl.
*G01L 1/04* (2006.01)
(52) U.S. Cl. .............. 73/862.453; 73/862.55; 73/862.41; 73/862.041
(58) Field of Classification Search ............ None
See application file for complete search history.

(56) References Cited

U.S. PATENT DOCUMENTS

| 4,127,027 A | 11/1978 | Berger ................... 73/144 |
| 5,629,487 A | 5/1997 | Mucke ................... 73/818 |
| 6,512,812 B1* | 1/2003 | Watanabe ............... 378/57 |
| 6,606,919 B1* | 8/2003 | Perenon et al. ......... 73/862.453 |
| 6,668,626 B1* | 12/2003 | Grefve et al. ............ 73/104 |
| 7,011,067 B1* | 3/2006 | Savel et al. ............. 123/188.3 |
| 2004/0237667 A1* | 12/2004 | Berger et al. ............ 73/862.55 |
| 2005/0039542 A1* | 2/2005 | Berger et al. ............ 73/818 |

FOREIGN PATENT DOCUMENTS

| DE | 298 24 236 | 9/2000 |
| DE | 102 24 938 | 1/2004 |
| EP | 0 595 072 | 5/1994 |

* cited by examiner

*Primary Examiner*—Edward Lefkowitz
*Assistant Examiner*—Freddie Kirkland, III
(74) *Attorney, Agent, or Firm*—Andrew Wilford

(57) ABSTRACT

A planarity-measuring roller for metallic strip has a plurality of force sensors set in respective outwardly open recesses in a roller body with respective covers overlying the sensors in the recesses, generally flush with an outer surface of the body, and spaced by a gap from the respective recesses. Metal foils overlie the recesses and are adhered to the covers and to the outer surface of the roller body all around the recesses.

9 Claims, 7 Drawing Sheets

PLANARITY-MEASURING ROLLER FOR STEEL STRIP

FIELD OF THE INVENTION

The present invention relates to an apparatus for measuring planarity in metal strip. More particularly this invention concerns a planarity-measuring roller for steel strip.

BACKGROUND OF THE INVENTION

In a steel mill, during the passage of the steel strip along the process line it is standard to measure the planarity of the strip being produced by a roller provided with force-measurement sensors set in the roller, forming measurement-point zones, and provided with covers for the force-measurement sensors. These covers are flush with the roller surface and are surrounded by a movement gap that allows some movement toward the respective force-measurement sensors.

Such planarity measurement rolls are known from EP 0,595,072 of Mucke in which the force-measurement sensors are spaced apart angularly and axially on the surface of the measurement roller so as to form respective measurement-point zones, with a free annular movement gap between the outer faces of their covers and the inner faces of the respective recesses in the roller in which they are housed (see EP 0,595,072). The annular movement gaps can each be closed by means of an O-ring or a plastic layer in order to prevent penetration of foreign particles with which the strips are often covered. These particles can be formed by abrasion of the zinc, so that in the case of zinc-coated strips the particles are of zinc. There is thus the risk of the particles wedging themselves in the movement gap and marring the strip surface as the strip passes in great longitudinal tension over the roller so that it bears with considerable radial force thereon.

In order to avoid such damage to the strip, it is known from German utility model 298 24 236 to provide the measurement roller and therefore its measurement-point zones with a covering. This covering can comprise several tubular sections or be a single cover tube. In the latter case, it is a thermally sprayed-on covering made from wear-resistant metal. A rubber coating or plastic coating, e.g. polyurethane coating, is however also known with planarity measurement rolls, in order to prevent foreign hard particles from collecting in the movement gaps of the coverings for the force-measurement sensors. The selection of a suitable coating or covering is dependent on the application. In the case of aluminum and special steel strips, for example, a rubber or plastic coating is usually used in order to take special care of the surface of the strip concerned. In the case of carbon-steel strip, on the other hand, hard coatings are often worked with, while with electrolytically zinc-coated strips a plastic coating is preferably employed.

If a hard coating of wear-resistant metals is deposited as a covering directly on the planarity measurement roll, there is a risk that, in the area of the movement gaps lying beneath this encasement, the hard coating will crack on account of microscopic movements of the coverings of the force-measurement sensors. This is because a radial elastic deformation of 1 $\mu m$ to 2 $\mu m$ due to the measurement force with a gap of 20 pm, for example, means 5 to 10% shear deformation. Such shear deformation cannot be absorbed for long by a hard coating.

If, on the other hand, the planarity measurement roller is surrounded by a support tube and the hard coating is deposited thereon the above-described shear deformations are avoided. Then, however, the auxiliary frictional connection via the tube has a disturbing effect, so that the measurement signals are negatively influenced in that the force must be applied through the tube to the sensors.

OBJECTS OF THE INVENTION

It is therefore an object of the present invention to provide an improved planarity-measuring roller.

Another object is the provision of such an improved planarity-measuring roller, particularly for steel strip that overcomes the above-given disadvantages, in particular that is of simple construction, that protects the sensors, and that does not impair the sensitivity of the sensors.

SUMMARY OF THE INVENTION

A planarity-measuring roller for metallic strip has as described above a plurality of force sensors set in respective outwardly open recesses in a roller body with respective covers overlying the sensors in the recesses, generally flush with an outer surface of the body, and spaced by a gap from the respective recesses. According to the invention metal foils overlie the recesses and are adhered to the covers and to the outer surface of the roller body all around the recesses.

With this system the encasement or coating deposited directly onto the measurement roll—irrespective of whether it involves a hard coating or a soft coating—is no longer subjected to a potentially destructive shear deformation in the area of the movement gaps surrounding the covers for the force-measurement sensors. This is due to the fact that, even with a radial elastic strain of the coating, such shear is prevented by the metal foils covering the measurement-point zones. Unlike a support tube, no problematic auxiliary frictional connection results from such membrane-like metal foils, so that the measurement signals produced by the sensors exhibit virtually no changes. This applies not only to annular measurement-point zones with force-measurement sensors according to above-cited EP 0,595,072 oriented along the rotational axis of the roll, but also when the measurement-point zones are formed by measurement bars on two supports, and on the one hand the measurement bars are surrounded by a movement gap, and on the other hand the supports are formed by force-measurement sensors which are not orientated radially to the rotational axis of the roll (see DE 102 24 938).

According to the invention either one such foil overlies each such recess or each foil overlies a plurality of the recesses. In the latter case, each foil can extend axially along a full width of the roller body.

The foils can be of spring steel and have a thickness between 10 $\mu m$ and 100 $\mu m$, preferably about 50 $\mu m$. They can be secured in place by a layer of adhesive or by a weld.

The roller can also be provided with a flexible sleeve covering the roller-body outer surface and foils. This sleeve can be of a flexible elastomer or plastic, e.g. polyurethane, or of a hard metal, e.g. hard chromium or tungsten carbide.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
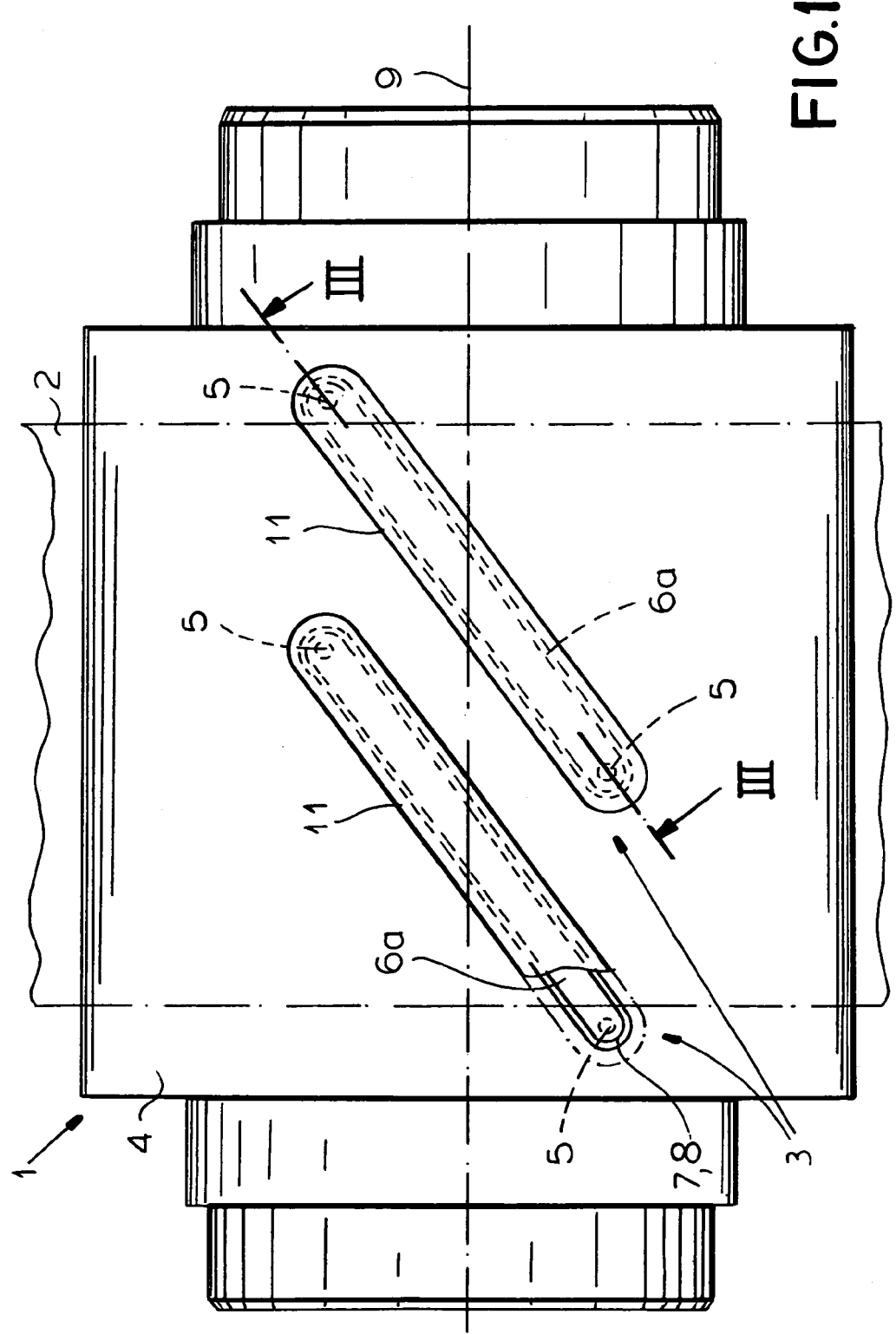
FIG. 1 shows a planarity measurement roller in a diagrammatic plan view without a casing.
Figure 2:
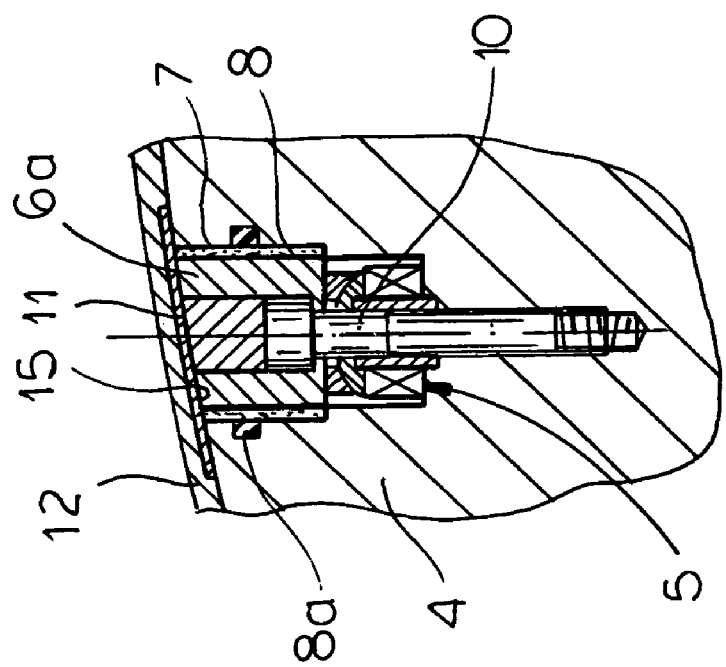
FIG. 2 is a cross section through the object according to FIG. 1 in the area of a force-measurement sensor.
Figure 3:
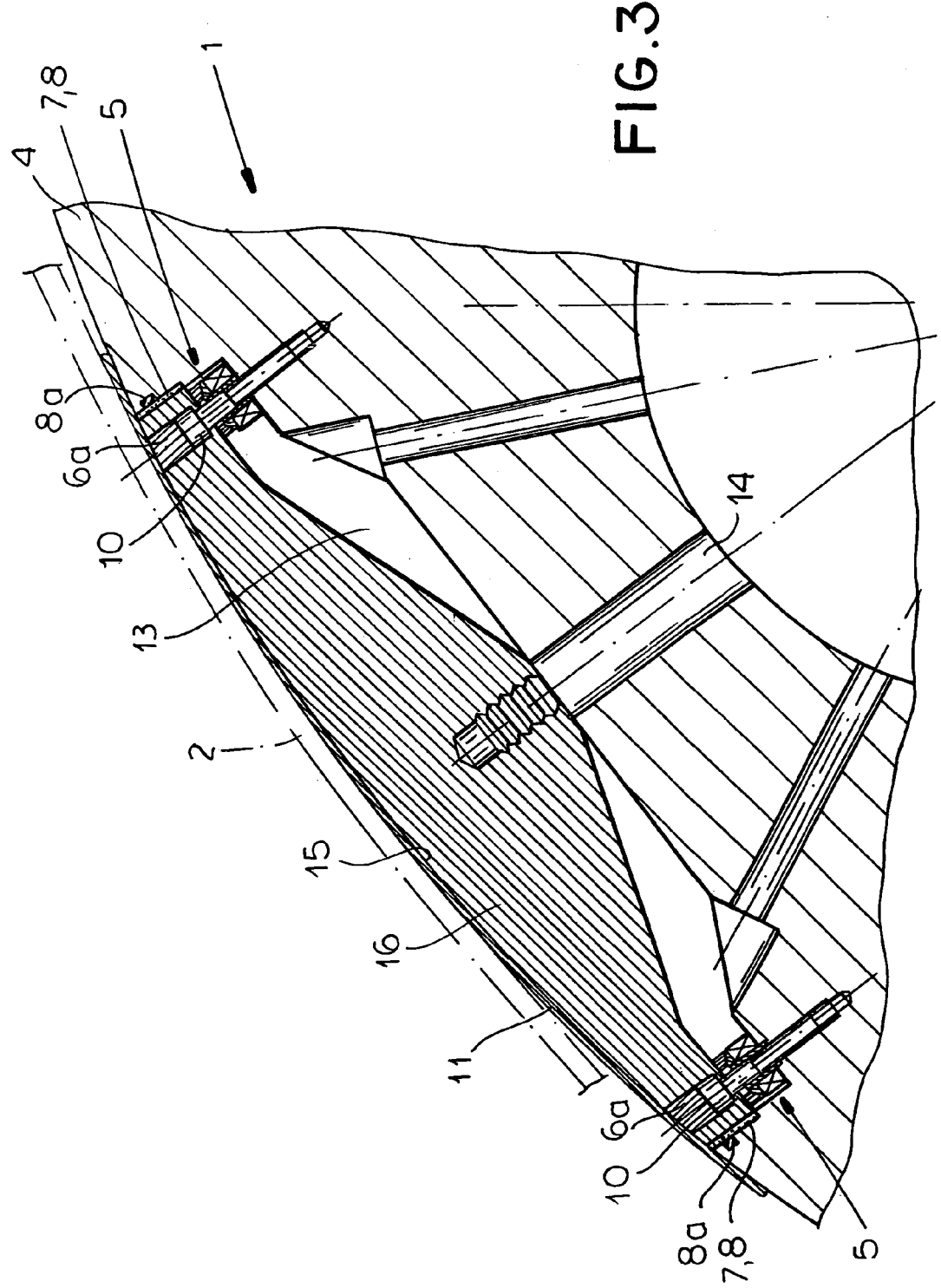
FIG. 3 is a cross section taken along line III—III of FIG. 1 longitudinally of a measurement bar.

As shown in FIGS. 1–3 a cylindrical planarity-measuring roller 1 has a body 4 centered on an axis 9 and formed with an array of elongated outwardly open slot-shaped seats or pockets 13 extending skew to the axis 9. Each such seat 13 holds at each of its ends a force-measurement sensor 5 constituted as a strain gauge held in place by a respective anchor screw 10 and connected via an unillustrated wire to also unillustrated control circuitry. Atop each such sensor 5 is a respective cover or cap 6a here formed by an end of a steel rocker beam 16 fitted to the seat 13 and held in place by a central mounting bolt 14. An annular gap 7 between an outer edge of the cover beam 16 and the inner surface of the seat 13 is here filled with an elastomeric body 8 permitting some radial and even angular and axial movement of the beam 16 relative to the roller body 4, and an O-ring 8a can be provided to further seal this gap 7. Thus no particles or, in a wet system, liquid can get into the gap 7 but the beam 16 can shift in the seat 13, mainly rocking inward at its ends 6a. A radially outer face of the cover beam 16 is flush with the cylindrical outer surface of the body 4.

According to the invention a flexible spring-steel foil 11 is secured by a layer 15 of adhesive to the outer surface of the cover/beam 6a and the adjacent edge region around the seat 13. This foil 11 has a thickness between 10 μm and 100 μm, preferably 50 μm. Thus it is quite flexible so that even as the ends of the beam 6a are pushed in, it will move elastically and effectively prevent entry of anything into the gap 7. Alternately, the layer 15 could be a weld joint.

Figure 4:
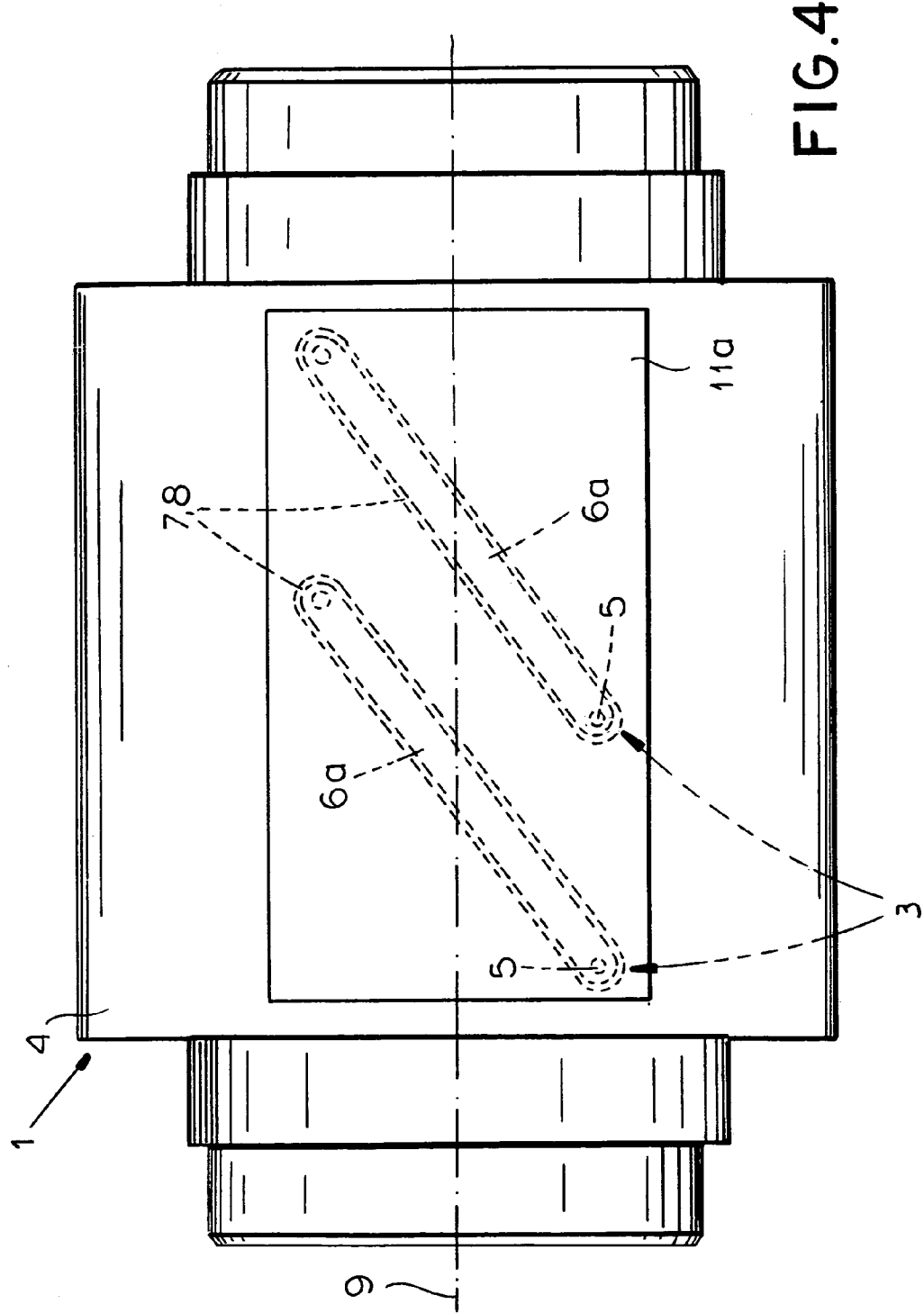
FIG. 4 is a modified embodiment of the instant invention.
Figure 5:
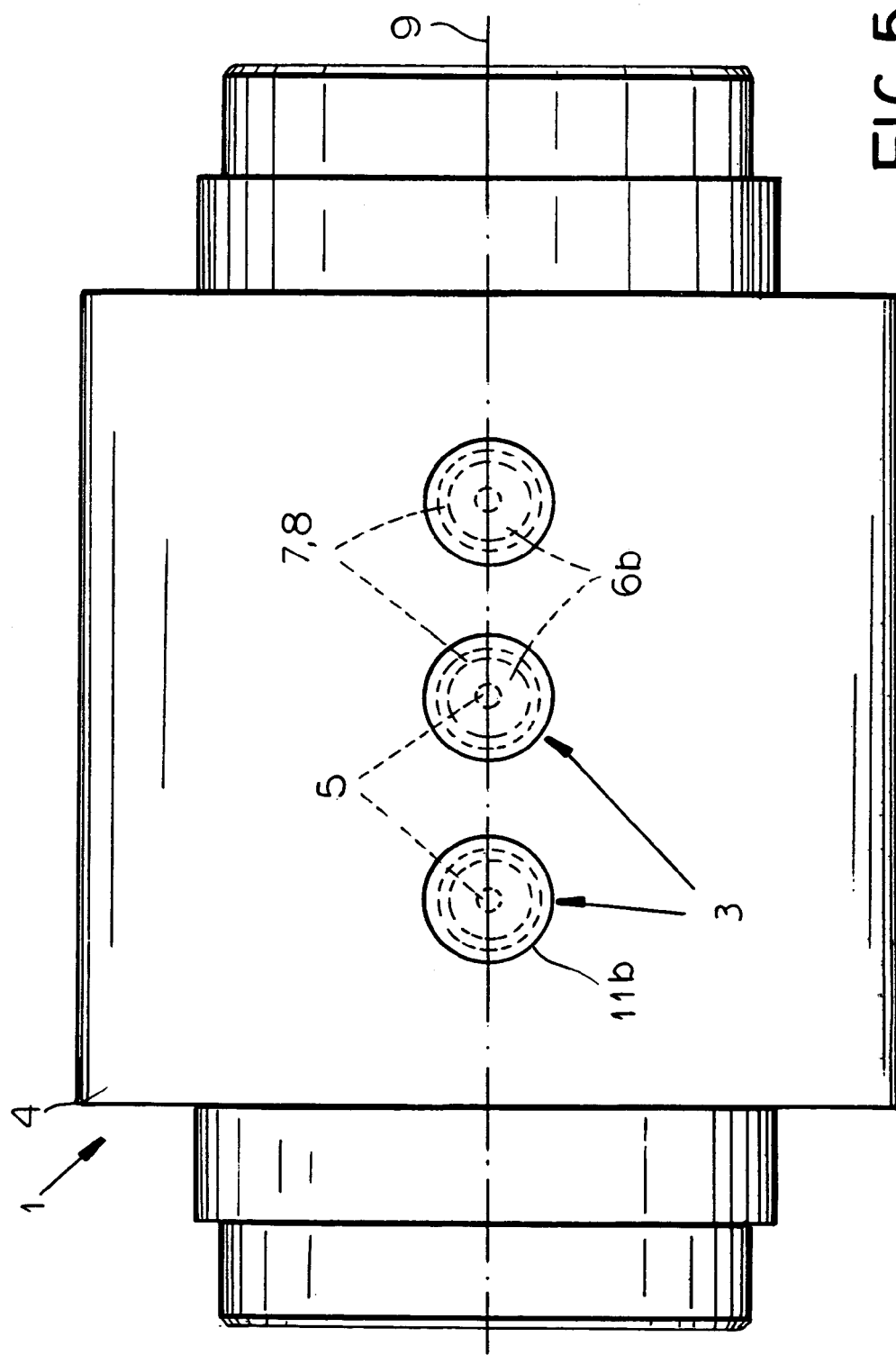
FIG. 5 is another embodiment of the invention.

In the system of FIG. 4 a single large piece 11a of foil covers two seats 13 and the associated four measurement points 3. This foil 11a does not, however, extend angularly all the way around the roller body 4. Alternately, in FIG. 5 there are small cylindrical covers 6b on the sensors 5 covered by respective small circular adhesive foils 11b. Here the measurement points are equispaced axially.

Figure 8:
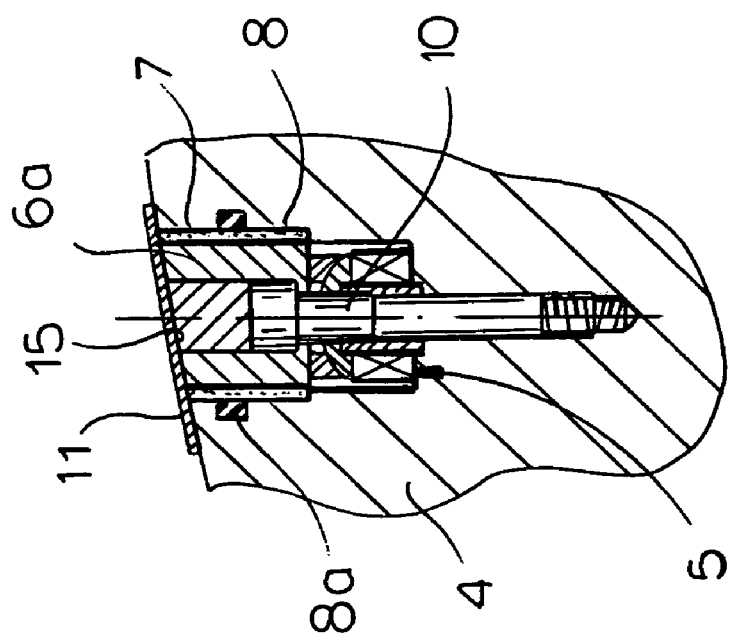
FIG. 8 is a cross section through system of FIG. 6 in the area of a force-measurement sensor.
Figure 6:
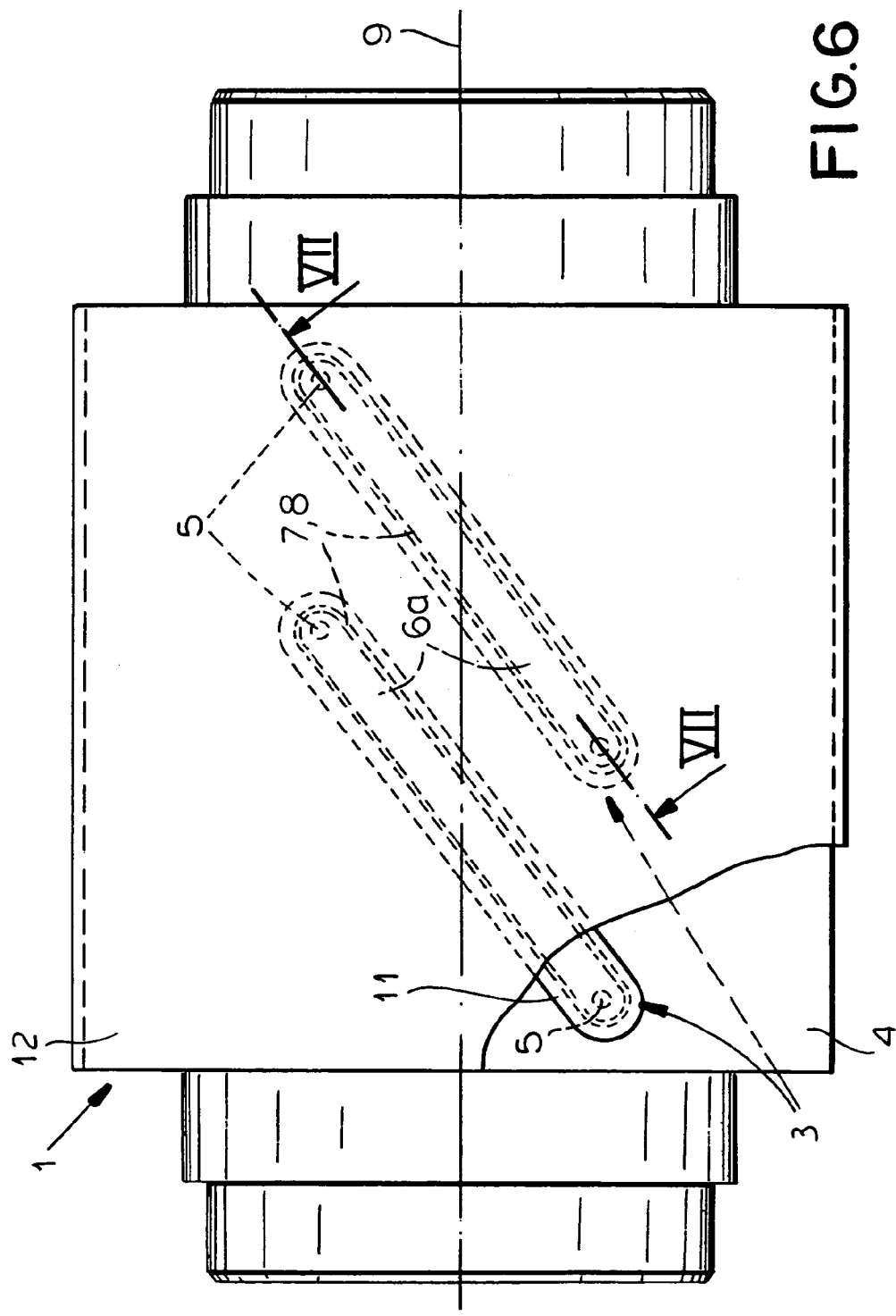
FIG. 6 is the roller of FIG. 1 with an encasement of hard metal.
Figure 7:
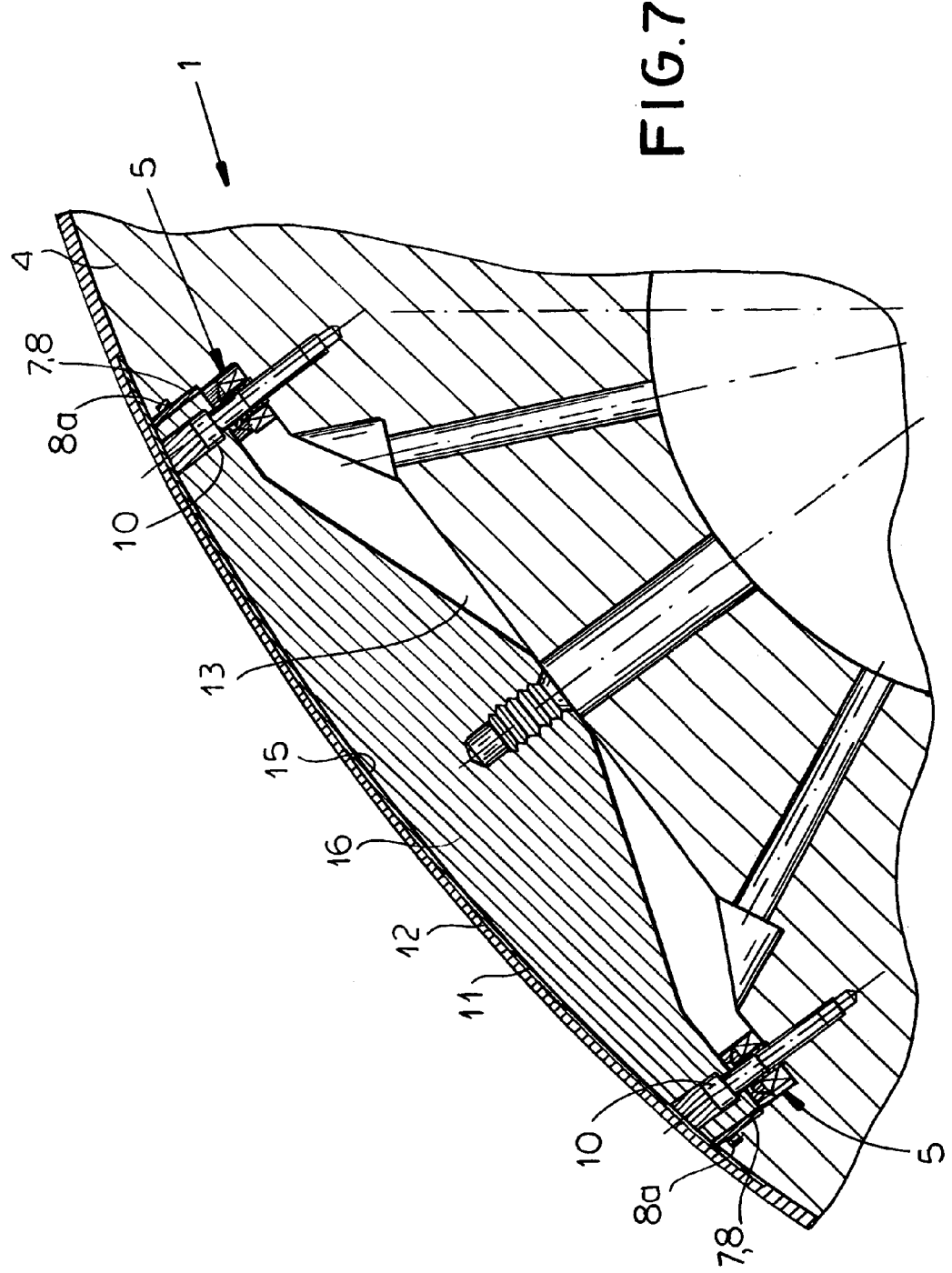
FIG. 7 is a section taken along line VII—VII of FIG. 6.

The arrangement of FIGS. 6–8 is identical to that of FIGS. 1–3 but also has a sleeve 12 of a hard metal, e.g. chromium steel or tungsten carbide, surrounding the roll body 4 over the foils 11. Alternately the sleeve 12 could be of hard but flexible plastic, e.g. polyurethane.

With this system thickness and shape variations of a steel strip 2 passing over the roll 1 are easily detected by the different pressures exerted on the measurement points 3.

I claim:

1. In a planarity-measuring roller for metallic strip wherein a plurality of force sensors are set in respective outwardly open recesses in a roller body with respective covers overlying the sensors in the recesses, generally flush with an outer surface of the body, and spaced by a gap from the respective recesses, the improvement comprising:

metal foils overlying the recesses;

means including a layer of adhesive adhering the foils to the covers and to the outer surface of the roller body all around the recesses, whereby the foils bridge and cover the respective gaps; and a flexible sleeve covering the roller-body outer surface and foils.

2. The improvement defined in claim 1 wherein there is one such foil overlying each such recess.

3. The improvement defined in claim 1 wherein each foil overlies a plurality of the recesses.

4. The improvement defined in claim 3 wherein each foil extends axially along a width of the roller body.

5. The improvement defined in claim 1 wherein the foils are of spring steel.

6. The improvement defined in claim 5 wherein the foils have a thickness between 10 μm and 100 μm.

7. The improvement defined in claim 5 wherein the foils have a thickness of about 50 μm.

8. The improvement defined in claim 1 wherein the sleeve is of polyurethane.

9. The improvement defined in claim 1 wherein the sleeve is of hard chromium or tungsten carbide.

* * * * *